(12) United States Patent
Hallur et al.

(10) Patent No.: US 11,321,130 B2
(45) Date of Patent: May 3, 2022

(54) CONTAINER ORCHESTRATION IN DECENTRALIZED NETWORK COMPUTING ENVIRONMENTS

(71) Applicant: KYNDRYL, INC., New York, NY (US)

(72) Inventors: Parashuram T. Hallur, Bengaluru (IN); Siddalinga Aradhya, Bengaluru (IN); Radheyshyam Sharma Sharma, Gaya (IN); Hari Prasad S, Bangalore (IN)

(73) Assignee: Kyndryl, Inc., New York, NY (US)

( * ) Notice: Subject to any disclaimer, the term of this patent is extended or adjusted under 35 U.S.C. 154(b) by 216 days.

(21) Appl. No.: 16/529,020

(22) Filed: Aug. 1, 2019

(65) Prior Publication Data

US 2021/0034423 A1    Feb. 4, 2021

(51) Int. Cl.
| | | |
|---|---|---|
| *G06F 9/50* | (2006.01) | |
| *G06F 9/455* | (2018.01) | |
| *G06F 21/31* | (2013.01) | |

(52) U.S. Cl.
CPC ........ *G06F 9/5016* (2013.01); *G06F 9/45558* (2013.01); *G06F 9/5044* (2013.01); *G06F 21/31* (2013.01); *G06F 2009/4557* (2013.01); *G06F 2009/45587* (2013.01)

(58) Field of Classification Search
CPC ... G06F 2009/4557; G06F 2009/45587; G06F 21/31; G06F 9/45533; G06F 9/45558; G06F 9/5016; G06F 9/5044
See application file for complete search history.

(56) References Cited

U.S. PATENT DOCUMENTS

| | | | |
|---|---|---|---|
| 8,694,400 B1 * | 4/2014 | Certain | G06Q 30/08 705/35 |
| 10,191,778 B1 | 1/2019 | Yang | |
| 2008/0126854 A1 * | 5/2008 | Anderson | G06F 11/203 714/13 |

(Continued)

OTHER PUBLICATIONS

"Docker Enterprise", Docker Documentation, Accessed Apr. 11, 2019, Printed Apr. 11, 2019, 3:35:29 PM, © 2019 Docker Inc., 7 pages, docs.docker.com/ee/>.

(Continued)

*Primary Examiner* — Jorge A Chu Joy-Davila
(74) *Attorney, Agent, or Firm* — Schmeiser, Olsen & Watts, LLP; Ken Han

(57) ABSTRACT

A computer-implemented method for deploying containers in a decentralized network computing environment includes: registering a predetermined amount of computing resources reserved by a plurality of computing devices for utilization as a worker node for running containers; receiving a request from a consumer node to provide services for deployment of a container workload; selecting at least a first computing device from the plurality of computing devices to serve as the worker node for deployment of the container workload; obtaining unidirectional control over a portion of the predetermined amount of computing resources reserved by at least the first computing device; and deploying the container workload on at least the first computing device. A corresponding computer system and computer program product are also disclosed.

20 Claims, 7 Drawing Sheets

(56) References Cited

U.S. PATENT DOCUMENTS

| | | | | |
|---|---|---|---|---|
| 2009/0177772 | A1* | 7/2009 | Guan | H04L 67/1002 709/224 |
| 2010/0262964 | A1* | 10/2010 | Uyeda | G06F 9/5088 718/1 |
| 2013/0198739 | A1* | 8/2013 | Razdan | G06F 9/45558 718/1 |
| 2013/0247034 | A1* | 9/2013 | Messerli | G06F 9/45533 718/1 |
| 2015/0331715 | A1* | 11/2015 | Sathyanarayana | G06F 9/5088 709/226 |
| 2016/0072877 | A1 | 3/2016 | Hirschfeld | |
| 2016/0378752 | A1* | 12/2016 | Anderson | G06F 16/245 707/747 |
| 2017/0346833 | A1* | 11/2017 | Zhang | H04L 9/3218 |
| 2018/0157516 | A1* | 6/2018 | Kristiansson | G06F 9/5055 |
| 2018/0365055 | A1 | 12/2018 | Bhimani | |
| 2019/0034313 | A1* | 1/2019 | Vedurumudi | G06F 11/3006 |
| 2020/0012577 | A1* | 1/2020 | Sarnad | G06F 11/2041 |

OTHER PUBLICATIONS

"Production-Grade Container Orchestiation", Kubernetes, Accessed Apr. 11, 2019, Printed Apr. 11, 2019, 3:31:50 PM, 3 pages, https://kubernetes.io>.

"Program against your datacenter like itÔs a single pool of resources", Apache MESOS, Accessed Apr. 11, 2019, Printed Apr. 11, 2019, 3:38:00 PM, © 2012-2018 The Apache Software Foundation, 2 pages, mesos.apache.org/>.

Mell, et al., "The NIST Definition of Cloud Computing", Recommendations of the National Institute of Standards and Technology, NIST Special Publication 800-145, Sep. 2011, 7 pages.

Wilson, D.,"Architecture for a Fully Decentralized Peer-to-Peer Collaborative Computing Platform", University of Ottawa, Thesis, Degree of Master of Computer Science Graduate Department of Computer Science, © Dany Wilson, Ottawa, Canada, 2015, 152 pages.

\* cited by examiner

CONTAINER ORCHESTRATION IN DECENTRALIZED NETWORK COMPUTING ENVIRONMENTS

BACKGROUND

The present invention relates generally to the field of virtualization, and more particularly to container-based virtualization.

Virtual machines (VMs) are widely used to create virtualization. VMs operate based on the computer architecture and functions of a real or hypothetical computer. A VM is a software implementation of a machine that executes programs like a physical machine. A single physical machine may support multiple VMs executed thereon and manage these VMs using a program called a "hypervisor." A hypervisor or virtual machine monitor (VMM) is computer software, firmware, or hardware that creates and runs virtual machines. A computer on which a hypervisor runs one or more virtual machines is called a host machine, and each virtual machine is called a guest machine.

Containers provide lightweight virtualization that allows for isolating processes and/or resources without the need of providing instruction interpretation mechanisms and/or other complexities of full virtualization. Containers effectively partition the resources managed by a single host operating system (OS) into isolated groups to better balance the conflicting demands on resource usage between the isolated groups. That is, the container technology allows sharing a common OS and possibly some appropriate binary files or libraries.

SUMMARY

According to one embodiment of the present invention, a computer-implemented method for deploying containers in a decentralized network computing environment is disclosed. The computer-implemented method includes registering a predetermined amount of computing resources reserved by a plurality of computing devices for utilization as a worker node for running containers. The computer-implemented method further includes receiving a request from a consumer node to provide services for deployment of a container workload. The computer-implemented method further includes selecting at least a first computing device from the plurality of computing devices to serve as the worker node for deployment of the container workload. The computer-implemented method further includes obtaining unidirectional control over a portion of the predetermined amount of computing resources reserved by at least the first computing device. The computer-implemented method further includes deploying the container workload on at least the first computing device.

According to another embodiment of the present invention, a computer program product for deploying containers in a decentralized network computing environment is disclosed. The computer program product includes one or more computer readable storage media and program instructions stored on the one or more computer readable storage media. The program instructions include instructions to register a predetermined amount of computing resources reserved by a plurality of computing devices for utilization as a worker node for running containers. The program instructions further include instructions to receive a request from a consumer node to provide services for deployment of a container workload. The program instructions further include instructions to select at least a first computing device from the plurality of computing devices to serve as the worker node for deployment of the container workload. The program instructions further include instructions to obtain unidirectional control over a portion of the predetermined amount of computing resources reserved by at least the first computing device. The program instructions further include instructions to deploy the container workload on at least the first computing device.

According to another embodiment of the present invention, a computer system for deploying containers in a decentralized network computing environment is disclosed. The computer system includes one or more computer system includes one or more computer processors, one or more computer readable storage media, and program instructions stored on the computer readable storage media for execution by at least one of the one or more processors. The program instructions include instructions to register a predetermined amount of computing resources reserved by a plurality of computing devices for utilization as a worker node for running containers. The program instructions further include instructions to receive a request from a consumer node to provide services for deployment of a container workload. The program instructions further include instructions to select at least a first computing device from the plurality of computing devices to serve as the worker node for deployment of the container workload. The program instructions further include instructions to obtain unidirectional control over a portion of the predetermined amount of computing resources reserved by at least the first computing device. The program instructions further include instructions to deploy the container workload on at least the first computing device.

DETAILED DESCRIPTION

Figure 1:
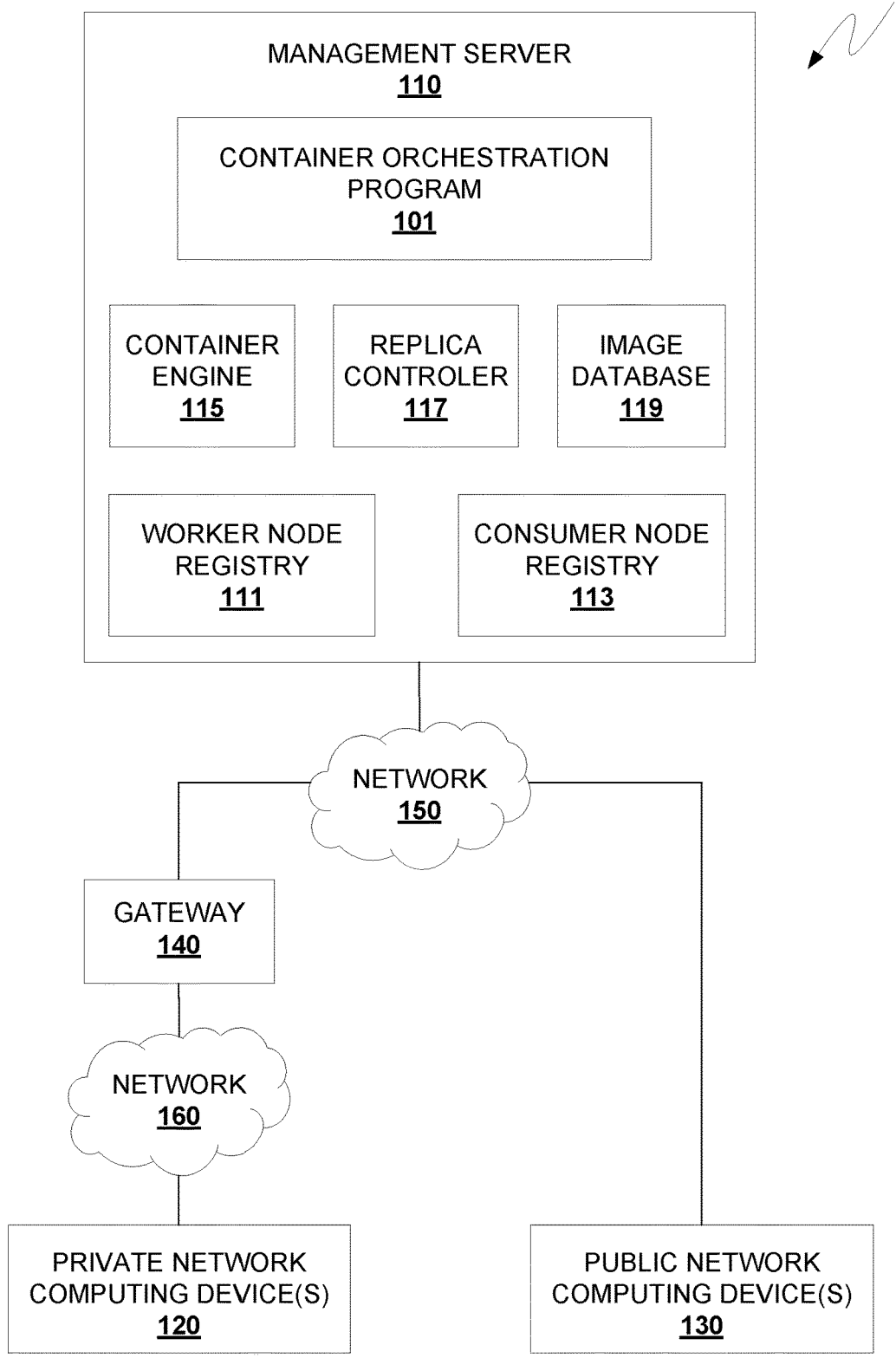
FIG. 1 is a functional block diagram of a decentralized network computing environment, generally designated 100, suitable for operation of a container orchestration program 101 in accordance with at least one embodiment of the invention.

There are two primary types of containers: (i) operating system (OS) containers and (ii) application containers. OS containers are virtual environments that share the kernel of the host operating system, but provide user space isolation. Like a physical OS, OS containers allow for installing, configuring, and running different applications and libraries. Similarly, like a virtual machine (VM), any applications running inside a container can only utilize resources that have been assigned to that container. OS containers are useful for distributing and running a plurality of identical or different OS packages, e.g., Linux-based operating system packages. Generally, OS containers are created from templates that determine the structure and contents of the container. This allows for creating containers that have identical environments with the same package versions and configurations across all containers.

Whereas OS containers are designed to run multiple processes and services, application containers are designed to package and run a single service. Docker is an open-source project that automates the deployment of applications inside software containers by providing an additional layer of abstraction and automation of operating-system-level virtualization on Linux. The term(s) "Docker" and "Linux" may be subject to trademark rights in various jurisdictions throughout the world and are used here only in reference to the products or services properly denominated by the marks to the extent that such trademark rights may exist. Docker uses resource isolation features of the Linux kernel such as cgroups and kernel namespaces to allow independent "containers" to run within a single Linux instance, avoiding the overhead of starting and maintaining virtual machines.

Kubernetes, Docker Swarm and Apache Mesos are open source container orchestration systems for automating deployment, scaling, and management of containerized applications across clusters of hosts. A container orchestration system deploys containers (i.e., workloads) to a plurality of nodes (e.g., a physical machine or virtual machine). Oftentimes, containers that work together and require the sharing of resources are encapsulated or logically grouped together and deployed as a single cohesive unit (i.e., a pod or swarm). For example, a cohesive unit may include one or more containers, storage resources, a unique network Internet protocol (IP) address and options that govern how the container(s) should run. If horizontal scaling of a cohesive unit is required, a plurality of replicated units are distributed over a cluster of nodes. The term "Kubernetes," "Docker Swarm," and "Apache Mesos" may be subject to trademark rights in various jurisdictions throughout the world and are used here only in reference to the products or services properly denominated by the marks to the extent that such trademark rights may exist.

Currently, container orchestration platforms operate within centralized or private network environments. In a centralized network environment, clusters are limited to a master computer (i.e., master node) and a number of pre-designated worker computers (i.e., worker nodes) that run containerized applications and other workloads. A worker node includes the services necessary to support containers that make up a cluster's workload. Each worker node is managed by a master node, which receives updates on each worker node's self-reported status. The master node, which runs on a centralized network server, acts as a unified endpoint for the designated worker nodes of the centralized network and is responsible for scheduling workloads, managing the workloads lifecycle, scaling and upgrades, as well as managing network and storage resources for those workloads.

Embodiments of the present invention recognize several shortcomings with current container orchestration platforms. Mainly, current container orchestration platforms are limited to the environment in which they are hosted. Accordingly, only those computing devices that are pre-configured as worker computers within the centralized network environment can be utilized as worker nodes. Furthermore, if additional workloads cannot be supported by the current pre-configured worker nodes, additional computing devices must be manually configured as worker nodes. Moreover, the number of potential computing devices that can be configured as worker nodes is limited to the number of computers and/or an availability of those computers that reside within the centralized network environment. This is particularly disadvantageous if the number of workloads or the performance requirements of requested workloads exceeds the number of available worker nodes and/or performance capabilities of the worker computers within the centralized network environment.

Embodiments of the present invention improve upon the foregoing deficiencies of current container orchestration platforms by implementing a container orchestration platform within a decentralized network computing environment. According to various embodiments, a flexible framework is provided that allows for any user or system administrator to opt-in or designate a computing device as a worker node, regardless of the type of network environment in which the computing device resides. Within this flexible framework, a user or system administrator can either fully designate a computing device as a worker node or provision a predefined amount of computing and memory resources for processing container workloads.

In embodiments of the invention, a dedicated server and/or cluster of servers can act as a master node that manages an ongoing registry of computing devices that have opted-in to be utilized as worker nodes within the decentralized network computing environment. In these embodiments, a computing device is capable of being registered as a worker node regardless of the physical location of the computing device or the network environment in which the computing device resides. Accordingly, computing devices residing outside a private network can be added ad hoc to run containerized applications for a private network computing environment if the computing devices in the private network are unable to process their own container workload. Similarly, computing devices residing within a private network can be added ad hoc to run containerized applications for a public network computing environment if the computing devices in the public network are unable to process their own container workload. Likewise, computing devices residing within a first private network can be added ad hoc to run containerized applications for a second, distinct private network if the computing devices in the second private network are unable to process their own container workload.

In various embodiments of the invention, a service-level agreement (SLA) is formed between the master node and worker node. For example, the SLA agreement can include, but is not limited to, the following information: (i) the number or percentage of CPU's of a computing device reserved for utilization as a worker computer, (ii) the number or percentage of cores in a CPU of a computing device reserved for utilization as a worker computer, (iii) the amount or percentage of memory of a computing device reserved for utilization as a worker computer, and (iv) the time period(s) in which said computing device is reserved for utilization as a worker computer. Based on the SLA agreement, a computing device can act as a worker computer on an ad hoc basis within any type of network environment, regardless of the type of network environment that the computing device actually resides.

Embodiments of the present invention provide for an improved container orchestration platform that: (i) manages and runs containers dynamically in a decentralized network computing environment 100; (ii) utilizes public computing devices as worker nodes on an ad hoc basis to process container workloads based on workload demands of private network computing environments; (iii) utilizes private network computing devices as worker nodes on an ad hoc basis to process container workloads based on workload demands of public network computing environments; (iv) manages workload demands by tapping into a computing devices underutilized computing resources; and (v) integrates the state of container workloads running on a public and/or private computing device within a decentralized storage architecture, thereby allowing any public or private computing device registered as a worker node to seamlessly run stateful containers previously run by other worker nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a decentralized network computing environment, generally designated 100, suitable for operation of a container orchestration program 101 in accordance with at least one embodiment of the invention. FIG. 1 provides only an illustration of one implementation and does not imply any limitations with regard to the environments in which different embodiments may be implemented. Many modifications to the depicted environment may be made by those of ordinary skill in the art without departing from the scope of the invention as recited by the claims.

Decentralized network computing environment 100 includes management server 110, private network computing device(s) 120, public network computing device(s) 130, and gateway 140 interconnected over network 150 and network 160. Network 150 and network 160 can be, for example, a telecommunications network, a local area network (LAN), a wide area network (WAN), such as the Internet, or a combination of the three, and can include wired, wireless, or fiber optic connections. Network 150 and network 160 can be capable of receiving and transmitting data, voice, and/or video signals, including multimedia signals that include voice, data, and video information. In general, network 150 and network 160 may be any combination of connections and protocols that will support communications between management server 110, private network computing device(s) 120, public network computing device(s) 130, gateway 140 and other computing devices (not shown) within decentralized network computing environment 100.

In various embodiments, network 150 is a public network. For example, network 150 is a network that is accessible to the public, such as the Internet. Accordingly, network 150 may be accessed by any computing devices, such as private network computing device(s) 120 and public network computing device(s) 130.

In various embodiments, network 160 is a private network. For example, access to private network computing device(s) 120 via network 160 is restricted to privileged users in order to promote a secured network environment. In these embodiments, a privileged user accesses a private network computing device 120 via network 160 through gateway 140. For example, gateway 140 is a computing device that processes and manages security protocols for access to private network computing device(s) 120. Generally, a gateway 140 may be any programmable electronic device or combination of programmable electronic devices that act as a gateway 140 between two networks, such as network 150 and network 160. For example, gateway 140 may be a router, firewall, server, or any other device or combination thereof that enables the transfer of data to, from, and/or between private network computing device(s) 120. In embodiments of the invention, gateway 140 includes relevant user authentication and authorization data in order to enforce user authentication and authorization processes when access to private network computing device(s) 120 is requested.

In various embodiments of the invention, management server 110, private network computing device(s) 120, public network computing device(s) 130, and gateway 140 are computing devices that can be a standalone device, a management server, a web server, a mobile device, or any other electronic device or computing system capable of receiving, sending, and processing data. In other embodiments, management server 110, private network computing device(s) 120, public network computing device(s) 130, and gateway 140 represent a server computing system utilizing multiple computers as a server system, such as in a cloud computing environment. In an embodiment, management server 110, private network computing device(s) 120, public network computing device(s) 130, and gateway 140 represent a computing system utilizing clustered computers and components (e.g. database server computers, application server computers, etc.) that act as a single pool of seamless resources when accessed within decentralized network computing environment 100. In general, management server 110, private network computing device(s) 120, public network computing device(s) 130, and gateway 140 represent any programmable electronic device or combination of programmable electronic devices capable of executing machine readable program instructions and communicating with container orchestration program 101 within decentralized network computing environment 100 via a network, such as network 150 and network 160. Management server 110, private network computing device(s) 120, public network computing device(s) 130, and gateway 140 may include internal and external hardware components, as depicted and described in further detail with respect to FIG. 5.

Management server 110 functions as a master computer within a master-worker node architecture and includes container orchestration program 101, worker node registry 111, consumer node registry 113, container engine 115, replica controller 117, and image database 119. In embodiments of the invention, container orchestration program 101 manages containerized applications across a cluster of nodes, such as private network computing device(s) 120, public network computing device(s) 130, and/or a combination of private network computing device(s) 120 and public network computing device(s) 130. Although container orchestration program 101 is depicted in FIG. 1 as being integrated with management server 110, in alternative embodiments, container orchestration program 101 can be remotely located from management server 110.

In embodiments of the invention, container orchestration program 101 registers computing devices in worker node registry 111 to be utilized as worker nodes within a master-worker node architecture for running containerized applications within decentralized network computing environment 100. In some embodiments, worker node registry 111 includes various information as to how and under what conditions a particular computing device can be utilized as a worker node. For example, worker node registry 111 includes information contained in an SLA for each registered computing device, such as, but not limited to: (i) the number or percentage of CPU's of a computing device reserved for utilization as a worker node; (ii) the number or percentage of cores in a CPU of a computing device reserved for utilization as a worker node; (iii) the amount or percentage of memory of a computing device reserved for utilization as a worker node; and (iv) the time period(s) in which said computing device is reserved for utilization as a worker node. In some embodiments, worker node registry 111 includes real-time information about the status of computing devices registered as worker nodes. For example, worker node registry 111 includes: (i) the particular containers and number of containers running on a worker node; (ii) availability of a worker node; (iii) performance metrics of a worker node; (iv) an amount or percentage of computing resources of a worker node currently being utilized for running containerized applications; (v) an amount or percentage of computing resources available for running containerized applications; and (vi) geographic location of a worker node.

In some embodiments, container orchestration program 101 registers computing devices in worker node registry 111 as a worker node on an ad-hoc basis. Here, a computing device, at any given point in time, can register a predetermined amount of computing resources for a predetermined term that is reserved for running containerized applications. In some embodiments, container orchestration program 101 registers computing devices in worker node registry 111 as a worker node to reserve a predetermined amount of computing devices on a routine or scheduled basis. For example, a computing device is registered to reserve 50 percent of its computing resources to be allocated for running containerized applications every Saturday and Sunday between the hours of 11:00 pm EST and 6:00 am EST. It should be appreciated that according to embodiments of the invention, a computing device can be registered to serve as a worker node for running containerized applications irrespective of the network environment in which the computing device resides. It should further be appreciated that according to embodiments of the invention, a computing device can be registered to allocate any number or percentage or computing resources during any predetermined period(s) of time for running containerized applications.

In embodiments of the invention, container orchestration program 101 registers consumer nodes in consumer node registry 113. Generally, consumer nodes are computing devices that request services to run a container workload. In some embodiments, consumer nodes are registered in consumer node registry 113 on an ad-hoc basis. Here, a computing device, at any given point in time, can request to utilize an amount of computing resources necessary to run one or more containerized applications for a predetermined term. In some embodiments, consumer nodes are registered in consumer node registry 113 on a routine or scheduled basis. Here, a computing device can register a container workload on a recurrent basis. For example, a consumer node requires a predetermined amount of computing resources necessary to run a container workload on weekdays between the hours of 8:00 am EST and 5:00 pm EST. In some embodiments, registering a consumer node includes storing container workload conditions including, but not limited to: (i) an amount of application containers (i.e., container workload) to be processed; (ii) an amount of computing resources required to run the container workload; (iii) the performance requirements for running the container workload; and (iv) a time period for which the applications are required to run.

In some embodiments, a consumer node is a master node residing within a centralized network computing environment (e.g., a private network computing device 120) requesting services to run a container workload and container orchestration program 101 deploys the container workload on at least one computing device residing outside of the centralized network computing environment. In some embodiments, a consumer node is a master node residing within a first centralized network computing environment requesting services to run a container workload and container orchestration program 101 deploys the container workload on at least one computing device residing within a second centralized network computing environment that is inaccessible to the consumer node. In some embodiments, a consumer node is a master node residing within a decentralized network computing environment 100 (e.g., a public network computing device 130) requesting services to run a container workload and container orchestration program 101 deploys the container workload on at least one computing device residing within a centralized network computing environment (e.g., a private network computing device 120) that is inaccessible to the consumer node.

In an embodiment, if the container workload is unable to be processed, container orchestration program 101 rejects registration of a consumer node and notifies the consumer node that the container workload is unable to be processed. In an embodiment, if the container workload is able to be processed, container orchestration program 101 registers the consumer node and sends a notification to the consumer node confirming successful registration of the container workload.

Container engine 115 executes on an operating system of a host, such as management server 110, in order to build application containers for deployment on one or more private or public computing devices selected to be utilized as a worker node. In these embodiments, container engine 115 is a component of container orchestration program 101. For example, container engine 115 is a software component or sub-system of container orchestration program 101 that creates and deploys application containers. In other embodiments, container engine 115 executes on an operating system of a worker node, such as private network computing device(s) 120 or public network computing device(s) 130. In these embodiments, container engine 115 is logically distinct from container orchestration program 101. For example, container engine 115 is a Docker engine for creating Docker containers that run on a worker node. While reference is made to Docker and/or Docker-specific elements, it should be understood that aspects of the present invention are not limited to Docker-specific elements and may be applied equally to other automated programs where application container creation and deployment is practiced.

In various embodiments, container engine 115 creates application containers that include the runtime components, such as files, environment variables, and libraries necessary to run an application as a single service. In some embodiments, container engine 115 creates a single application container that is deployed on a computing device invoked as a worker node. In other embodiments, container engine 115 creates two or more application containers that are grouped together and deployed on a computing device as a single manageable entity or group (i.e., multiple application containers are logically grouped together and share common resources). In these embodiments, a group of containers are automatically co-located and co-scheduled on the same physical (or virtual) machine. In general, an application container represents a single instance of an application. In various embodiments, application containers and/or groups of application containers can be scaled horizontally, such that an application container and/or group of application containers represents a separate instance of the same application.

Replica controller 117 executes on an operating system of a host, such as management server 110, in order to generate replication containers and/or groups of logically related containers for deployment on one or more private or public computing devices registered as a worker node in worker node registry 111. In these embodiments, replica controller 117 is a component of container orchestration program 101. For example, replica controller 117 is a component or sub-system of container orchestration program 101 that creates and deploys replicated application containers. In other embodiments, replica controller 117 executes on an operating system of a registered worker node, such as private network computing device(s) 120 or public network computing device(s) 130. In these embodiments, replica controller 117 is logically distinct from container orchestration program 101. For example, replica controller is a Docker replica engine for replicating application containers. While reference is made to Docker and/or Docker-specific elements, it should be understood that aspects of the present invention are not limited to Docker-specific elements and may be applied equally to other automated programs where application container creation and deployment is practiced.

In various embodiments, replica controller 117 generates replication containers and/or groups of logically related application containers from a template. A template defines the application container(s) and/or group(s) of logically related application containers, storage resources, and rules that govern how the container(s) and/or group(s) of containers should run. In various embodiments, replica controller 117 ensures that the number of replica containers and/or groups of logically related containers defined for a service matches the number of currently deployed containers and/or groups of logically related containers. In other words, replica controller 117 maintains a desired number of copies of deployed containers and/or groups of containers. For example, if Application Container A running on Computing Device 123 (not depicted) temporarily goes down, replica controller 117 starts up an identical copy of Application Container A—Application Container A'—on Computing Device 123 (not depicted). However, if Application Container A comes back online, replica controller 117 removes Application Container A'. In another example, if Computing Device 123 (not depicted) fails, replica controller 117 replaces Application Container B by scheduling an identical replacement of Application Container B—Application Container B'—on Computing Device 456 (not depicted). However, if computing Device 123 (not depicted) comes back online, replica controller 117 cancels or terminates Application Container B' on Computing Device 456 (not depicted).

Image database 119 is a repository of images used to build an application container. Generally, an image as used herein is an inert, immutable file (essentially a snapshot of a base image of a container), comprised of multiple layers, used to execute code in a container. The image includes all of the requirements for running a container (e.g., system libraries, tools, and files), as well as metadata that describes the requirements and/or dependencies for the executable code of an image. In some embodiments, container engine 115 generates container images in response to receiving a build command. In some embodiments, container engine 115 receives container images associated with a consumer node's service request to run a container workload. In some embodiments, container engine 115 pulls or downloads container images from image database 119 onto a computing device invoked as a worker node.

In various embodiments, a newly created container is formed from a base image (comprised of one or more immutable layers) and a container layer, which hosts all changes (e.g., newly written files, modifications to files, and newly deleted files) made to a container deployed and running on a physical or virtual machine. Thus, whereas multiple containers can share the same underlying base image, the container layer allows different containers formed from the same base image to maintain individual records of its own data state (i.e., state information).

Figure 2:
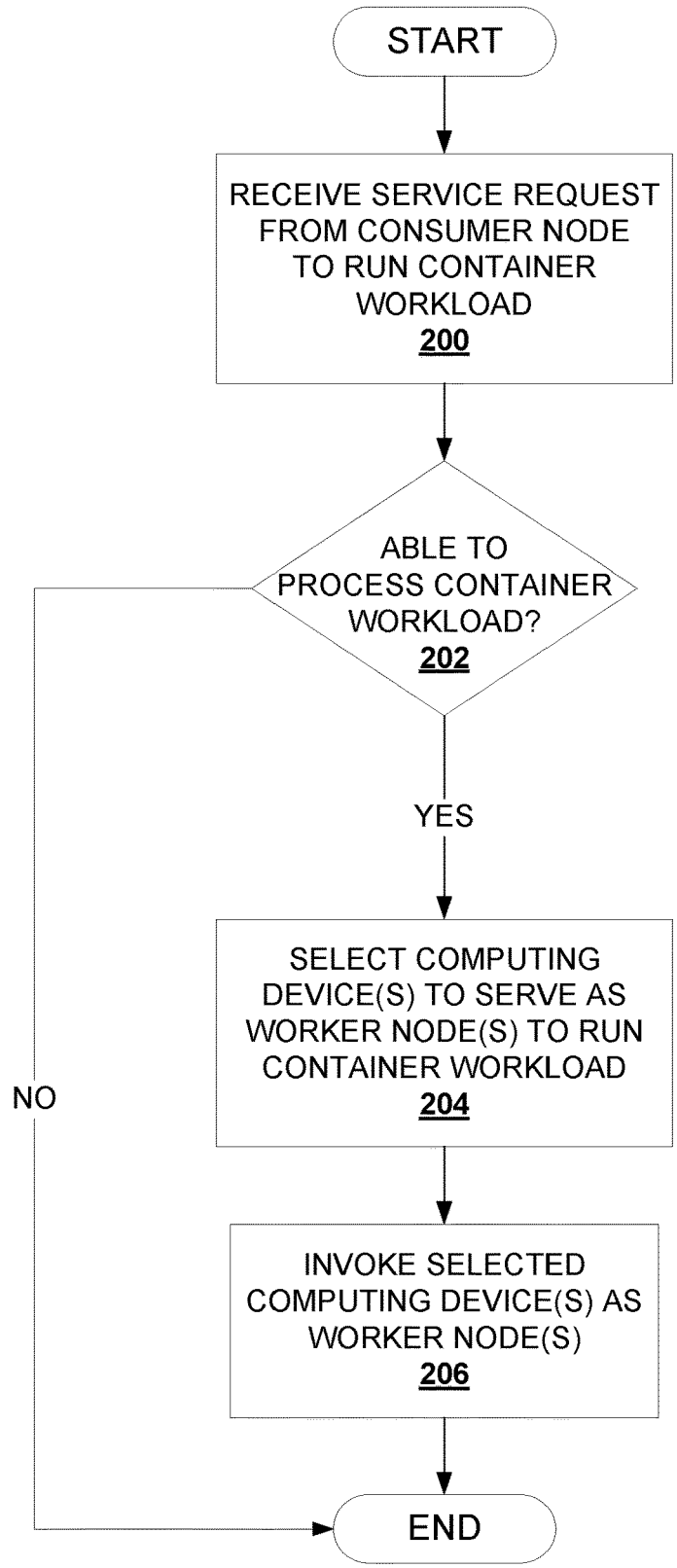
FIG. 2 is a flow chart diagram depicting operational steps for processing a container workload request by container orchestration program 101 within decentralized network environment 100 in accordance in accordance with at least one embodiment of the invention.

FIG. 2 is a flow chart diagram depicting operational steps for processing a container workload request by container orchestration program 101 within decentralized network environment 100 in accordance with at least one embodiment of the invention. FIG. 2 provides only an illustration of one implementation and does not imply any limitations with regard to the environments in which different embodiments may be implemented. Many modifications to the depicted environment may be made by those of ordinary skill in the art without departing from the scope of the invention as recited by the claims.

At step S200, container orchestration program 101 receives a service request from a consumer node to run a container workload. One of ordinary skill in the art will appreciate that a consumer node is a person or thing that purchases goods or services for personal use. For example, a consumer node is a computing device, such as a master node residing within a centralized or private network that purchases computing resources and/or services for running containerized applications on computing devices that exist outside the centralized network. In another example, a consumer node is a computing device, such as a master node residing in a public network that purchases computing resources and/or services for running containerized applications on computing devices that exist outside the public network. In some embodiments, the service request to run and/or service a container workload is generated from a private network computing device 120. In some embodiments, the service request to run and/or service a container workload is generated from a public network computing device 130. In various embodiments, the service request includes one or more of the following requirements: (i) a number of containers for deployment; (ii) resources required for running the containers; and (iii) a time period for which or during which the containers will run.

At decision step S202, container orchestration program 101 determines whether the container workload can be processed. In some embodiments, whether a container workload can be processed is based, at least in part, on the availability and capabilities of the computing devices registered in worker node registry 111 being able to fulfill the requirements of the container workload at the time the service request is received. In other embodiments, whether a container workload can be processed is based, at least in part, on the availability and capabilities of the computing devices registered in worker node registry 111 being able to fulfill the requirements of the container workload at a future point in time when the container workload is scheduled to commence. In various embodiments, container orchestration program 101 makes a determination based on one or more of the following: (i) the number of available computing devices registered as worker nodes; (ii) the time period(s) in which the registered computing devices are reserved for utilization as worker nodes; (iii) the number of available CPUs reserved for utilization as a worker node; (iv) the performance capabilities of each available CPU; (v) the number of available cores (and/or a percentage of each available core) reserved for utilization as a worker node; (vi) the time period in which the available CPUs and cores are reserved for utilization as a worker node; and (vii) the geographic location of the worker nodes relative to the geographic location of the consumer node.

If container orchestration program 101 determines that the container workload cannot be processed (decision step S202 NO branch), container orchestration program 101 notifies the consumer node that the service request cannot be processed and the process ends. If container orchestration program 101 determines that the container workload can be processed (decision step S202 YES branch), container orchestration program 101 proceeds to step S204.

At step S204, container orchestration program 101 selects one or more computing devices registered in worker node registry 111 to serve as worker nodes to run the container workload. In embodiments of the invention, the number of computing devices selected is based, at least in part, on: (i) the requirements of the container workload; and (ii) a minimum number of computing devices necessary to provide a sufficient amount of computing resources to fulfill the requirements of the container workload. In various embodiments, container orchestration program 101 selects computing devices from worker node registry 111 that will yield the highest quality of service (QoS) to the consumer node with regards to servicing the container workload. For example, container orchestration program 101 selects computing devices from worker node registry 111 that will yield the highest QoS based on one or more of the following factors: (i) processor speed; (ii) type of storage (e.g., solid state storage or hard disk storage); (iii) amount of free RAM space reserved for running a containerized application(s); (iv) amount of free cache memory space reserved for running a containerized application(s); (v) geographic location of a computing device registered in worker node registry 111 with respect to computing devices accessing the applications running on the registered computing device; (vi) historical performance data with regards to prior containerized applications running on a computing device registered in worker node registry 111 (e.g., availability, number of container failures, etc.); and (vii) network speed and bandwidth available to a computing device registered in worker node registry 111.

In some embodiments, container orchestration program 101 selects a minimum number of computing devices from worker node registry 111 necessary to service the container workload and that will yield the highest QoS. In these embodiments, each selected computing device runs at least a portion of the container workload. In other embodiments, container orchestration program 101 selects an additional number of computing devices from worker node registry 111 in excess of the minimum number of computing devices necessary to service the container workload. In these embodiments, a first group of the selected computing device (s) that will yield the highest QoS initially run the container workload. A second group of the selected computing device (s) are designated as standby worker nodes in the event of an application container failure (e.g., due to a lack of resources, operating system failure of a computing device invoked as a worker node, request for relinquishing control of a computing device invoked as a worker node to run a container (s)).

At step S206, container orchestration program 101 invokes the one or more computing devices as worker nodes in a master-worker configuration. Here, container orchestration program 101 obtains unidirectional control over a predetermined amount of computing resources reserved by each selected computing device. In some embodiments, once container orchestration program 101 obtains unidirectional control over the predetermined amount of computing resources, the computing device is locked out from accessing or otherwise utilizing the predetermined amount of computing resources. For example, the computing device is locked out for a predetermined amount of time or period of time in which the computing device reserved the predetermined amount of computing resources for utilization as a worker node. Further, container orchestration program 101 terminates unidirectional control over the predetermined amount of computing resources at the end of the predetermined amount of time or time period registered in worker node registry 111, returning control of the predetermined amount of computing resources to the computing device.

In other embodiments a computing device under unidirectional control can re-establish access or otherwise control over the predetermined amount of computing resources. In these embodiments, a user or system administrator of a computing device can send a request to relinquish unidirectional control over the predetermined amount of computing resources reserved by the computing device. In an embodiment, in response to receiving the request to relinquish unidirectional control, container orchestration program 101 immediately terminates unidirectional control over the predetermined amount of computing resources and deletes any containers running on the computing device. In an embodiment, once the request to relinquish unidirectional control is received, container orchestration program 101 does not immediately terminate unidirectional control over the predetermined amount of computing resources. Rather, prior to terminating unidirectional control, container orchestration program 101 generates a replica of the container workload or portion of the container workload running on the computing device and deploys the container workload or portion of the container workload on another computing device registered in worker node registry 111.

Figure 3:
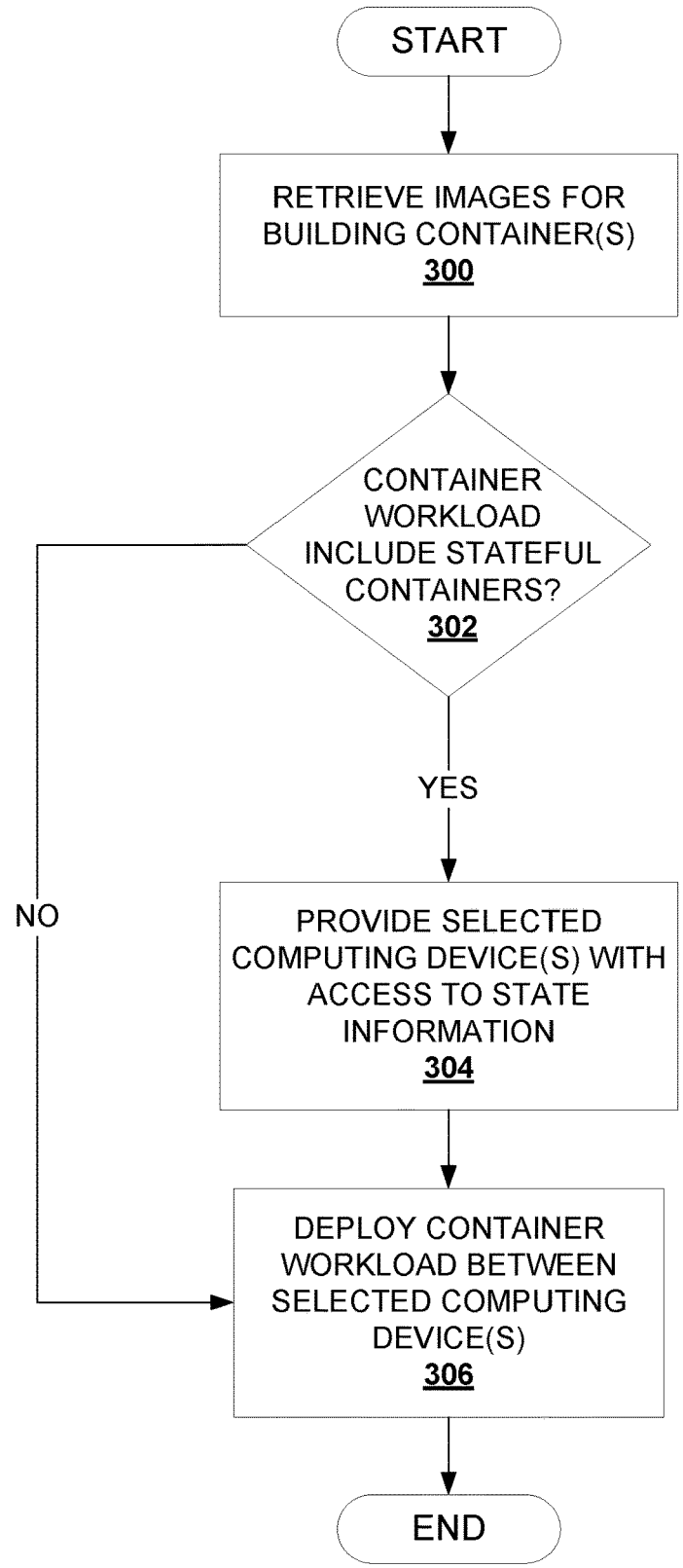
FIG. 3 is a flow chart diagram depicting operational steps for deploying a container workload by container orchestration program 101 within decentralized network environment 100 in accordance in accordance with at least one embodiment of the invention.

FIG. 3 is a flow chart diagram depicting operational steps for deploying a container workload by container orchestration program 101 within decentralized network computing environment 100 in accordance with at least one embodiment of the invention. FIG. 3 provides only an illustration of one implementation and does not imply any limitations with regard to the environments in which different embodiments may be implemented. Many modifications to the depicted environment may be made by those of ordinary skill in the art without departing from the scope of the invention as recited by the claims.

At step S300, container orchestration program 101 retrieves image(s) for building containers in accordance with the container workload. In an embodiment, container orchestration program 101 retrieves images included in the service request received from the consumer node. In an embodiment, container orchestration program 101 retrieves images from image database 119. In an embodiment, retrieving images further includes creating images from existing containers. In an embodiment, retrieving images further includes building images from an image file. In some embodiments, retrieving images includes pulling or downloading one or more images onto computing devices invoked as worker nodes in the first group of worker nodes selected to run the container workload. In other embodiments, retrieving images includes pulling or downloading one or more images onto computing devices invoked as worker nodes in both the first group of worker nodes initially selected to run the container workload and the second group of worker nodes selected as standby worker nodes. In some embodiments, retrieving images includes pulling or downloading the images onto a master computer, such as management server 110. In an embodiment, container orchestration program 101 downloads previously created images from image database 119 onto computing devices invoked as worker nodes. In other embodiments, container orchestration program 101 does not download images, but rather issues build instructions to computing devices invoked as worker nodes to create images.

At decision step S302, container orchestration program 101 determines whether the container workload includes stateful containers. Generally, a state of an application or container can refer to any changeable condition, including but not limited to: results of internal operations; interactions with other application or services; user-set preferences; environment variables; the contents of memory; and files opened, read from, or written to. One of ordinary skill in the art will appreciate that a stateful application or stateful container is one that remembers at least some information with regards to its state each time the application or containerized application runs. Similarly, one of ordinary skill in the art will appreciate that a stateless application or stateless container is one that neither reads nor stores information about its state from one time that it is run to the next.

In some embodiments, container orchestration program 101 determines whether the container workload includes stateful containers based on accessing information included in one or more image(s) used to form the containers associated with the container workload. In some embodiments, container orchestration program 101 determines whether the container workload includes stateful containers based on accessing information included in a template(s) for building a container associated with the container workload. In some embodiments, container orchestration program 101 determines whether the container workload includes stateful containers based on accessing state information generated containers running on previous computing devices. In some embodiments, container orchestration program 101 determines whether the container workload includes stateful containers based on information in the service request received from a consumer node.

If container orchestration program 101 determines that the container workload does include stateful containers (decision step S302 YES branch), container orchestration program 101 proceeds to step S304. If container orchestration program 101 determines that the application container workload does not include stateful containers (decision step S302 NO branch), container orchestration program 101 proceeds to step S306.

At step S304, container orchestration program 101 provides access to state information to the computing devices selected to run the container workload. In some embodiments, container orchestration program 101 only provides access to state information to the first group of computing devices selected to initially run the container workload. In other embodiments, container orchestration program 101 provides access to state information to the first group of computing devices and the second group of computing devices selected as standby worker nodes.

In embodiments of the invention, container orchestration program 101 deploys application containers that are linked to a volume. Generally, the term volume as used herein is a shared directory that contains the data specific to an individual container. A volume allows stateful information about an application to persist—even when a container is deleted—since the volume exists outside the container. From the standpoint of a container, a volume serves as a folder or mount point to a directory for storing and retrieving data. Accordingly, a volume allows a master node, such as container orchestration program 101, to push state information to a container running on a computing device invoked as a worker node, allows a container running on a computing device invoked as a worker node to store state information associated with a containerized application outside of the container, and/or allows state information associated with a containerized application to be shared between containers. In some embodiments, volumes are stored in a database on management server 110. In other embodiments, volumes are stored in cloud based storage. Accordingly, computing devices invoked as worker nodes, regardless of the network environment in which they exist, can access state information associated with application containers by linking containers to volumes stored in cloud storage. This is especially advantageous in that individual volumes need not be physically moved between worker nodes during migration of stateful containers or if a new container is created on a different worker node that requires state information generated by a prior container.

In various embodiments, access to a volume or directory is accomplished via container orchestration program 101 mounting a volume as a local file system on a computing device invoked as a worker node. In various embodiments, container orchestration program 101 mounts a volume on a worker node based on validating security credentials received from the worker node. For example, container orchestration program 101 receives a temporary access key ID (i.e., access ID) corresponding to a volume and a secret access key in the service request from the consumer node and sends the temporary access key ID and secret access key to a worker node. In some embodiments, the temporary access key ID and secret access key are only valid during the time period for which a stateful container is required to run. Once the application container ceases to run in accordance with the requirements of the consumer node's request, container orchestration program 101 invalidates the temporary access key ID and secret access key.

At step S306, container orchestration program 101 deploys containers associated with the container workload between the selected computing devices. In some embodiments, containers are only deployed to the first group of computing devices selected to initially run the container workload. In other embodiments, containers are deployed to the first group of computing devices and the second group of computing devices selected as standby worker nodes. One of ordinary skill in the art will appreciate that container deployment is the building and running of containerized applications on a host operating system, such as a worker node. In various embodiments, application containers are constructed from a base image (i.e., one or more image layers) and a container layer (i.e., a writable layer added on top of the base image). One of ordinary skill in the art will appreciate that although all write operations (i.e., changes) that occur inside the container are stored in the writable layer and accordingly, when the container is deleted, the writable layer is also deleted while the underlying base image remains unchanged.

In some embodiments, container orchestration program 101 creates application containers from images using a template(s) and deploys the application containers on one or more computing devices invoked as a worker node. In other embodiments, container orchestration program 101 does not create application containers. Rather, application containers are created by one or more computing devices selected to run the application containers. In these embodiments, container orchestration program 101 instructs the one or more computing devices invoked as worker nodes to create and run containers by issuing a container run command. The container run command is an instruction to create a container in accordance with a predetermined template. In any of the embodiments, if an application container is a stateful container, thus requiring state information, deployment of the application container further includes mounting a volume on the worker node running the stateful container.

Figure 4:
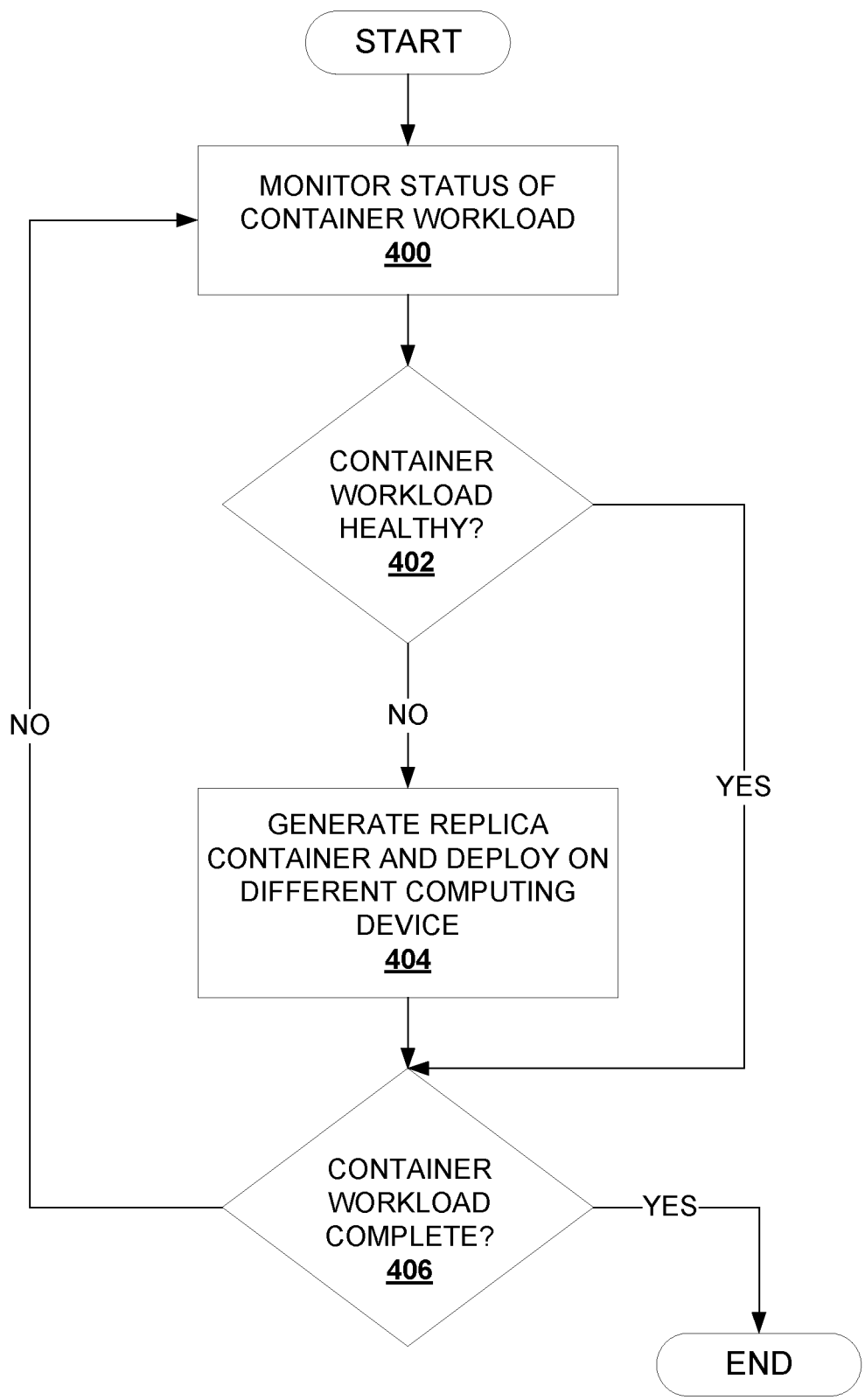
FIG. 4 is a flow chart diagram depicting operational steps for managing a deployed container workload by container orchestration program 101 within decentralized network environment 100 in accordance in accordance with at least one embodiment of the invention.

FIG. 4 is a flow chart diagram depicting operational steps for managing a deployed container workload by container orchestration program 101 within decentralized network environment 100 in accordance in accordance with at least one embodiment of the invention. FIG. 4 provides only an illustration of one implementation and does not imply any limitations with regard to the environments in which different embodiments may be implemented. Many modifications to the depicted environment may be made by those of ordinary skill in the art without departing from the scope of the invention as recited by the claims.

At step S400, container orchestration program 101 monitors the status of each container of a container workload running on one or more computing devices invoked as worker nodes. In some embodiments, container orchestration program 101 monitors the status of individual application containers. In some embodiments, container orchestration program 101 monitors the status of individual application containers within a group of logically related containers. In embodiments of the invention, monitoring the status of an application container includes monitoring the status of the container itself and/or the application running within the container.

In some embodiments, container orchestration program 101 monitors the status of an application running in a container through the use of log entries. A log entry may generally be understood as a record of information related to an event that occurred during the operation of a system (e.g., an operating system or virtual machine), software component (e.g., an application or middleware), or database. Generally, a log entry may include information such as the date and time of the event (i.e., timestamp), an event message (e.g., "Retrying request from the application source"), the type of log entry (e.g., "INFO", "WARNING", "ERROR", "DEBUG", etc.), and the source (e.g., IP address) from which the event occurred. In these embodiments, log monitoring agents may be implemented on worker nodes running containerized applications, such that log entries are automatically transmitted in real-time to container orchestration program 101 via a network, such as network 150 and network 160.

In some embodiments, container orchestration program 101 monitors the status of an application running in a container through the use of activity monitoring software. Activity monitoring may generally be understood as a record of information related to user, system, and/or software actions while communicating with or otherwise interacting with a computer system (e.g., a server, virtual machine, or desktop computer), software component (e.g., an application or middleware), database, or external hardware. More specifically, user activity monitoring is the monitoring and recording of user, system and/or software actions, including, but not limited to the use of applications and the execution of system commands and scripts by the application. In these embodiments, user activity monitoring software may be implemented on worker nodes running containerized applications, such that the execution of system commands and scripts associated with the application are automatically transmitted in real-time to container orchestration program 101 via a network, such as network 150 and network 160.

At decision step S402, container orchestration program 101 determines whether the container workload is healthy. In some embodiments of the invention, container orchestration program 101 determines that a container is unhealthy based, at least in part, on identifying an anomaly between containers running on the worker nodes. Generally, an anomaly as used herein is an irregularity in the behavior of a containerized application running on a computing device invoked as a worker node. In an embodiment, container orchestration program 101 identifies anomalies based, at least in part, on comparing application log information associated with containerized applications running on a common worker node. For example, container orchestration program 101 identifies an "Error" or "Warning" log entry associated with a first containerized application, but does not identify an "Error" or Warning" log entry associated with other containerized applications running on the same worker node. In an embodiment, container orchestration program 101 identifies anomalies based, at least in part, on comparing the status of containerized applications running on a common worker node. For example, container orchestration program 101 identifies that an application container is in the process of restarting, whereas other application containers are currently running on the same worker node.

If container orchestration program 101 determines that the container workload is healthy (decision step S402 YES branch), container orchestration program 101 proceeds to decision step S406. If container orchestration program 101 determines that the container workload is not healthy (decision step S402 NO branch), container orchestration program 101 proceeds to step S404.

At step S404, container orchestration program 101 generates a replica container corresponding to the unhealthy container and deploys the replica on another computing device registered in worker node registry 111. In some embodiments, deploying a new container includes creating a new container from a template. In some embodiments, deploying a new container includes generating a replica of the original application container. In these embodiments, container orchestration program 101 migrates the image linked to the container between two worker nodes. For example, the image(s) contained in the container is saved into a compressed file and a new container is created with the saved image(s) on a different worker node, thereby preserving the data of the application created inside the container. In those instances where stateful containers are terminated and restarted on a different worker node, container orchestration program 101 mounts the volume on the new worker node such that newly created and/or replicated application containers can resume running at their previous state prior to the termination.

At decision step S406, container orchestration program 101 determines whether the service requested by the consumer node is complete. If container orchestration program 101 determines that the service is not complete (decision step S406 NO branch), container orchestration program 101 returns to step S400. If container orchestration program 101 determines the service is complete (decision step S406 YES branch), container orchestration program 101 notifies the consumer node that the container workload is finished and the process ends.

Figure 5:
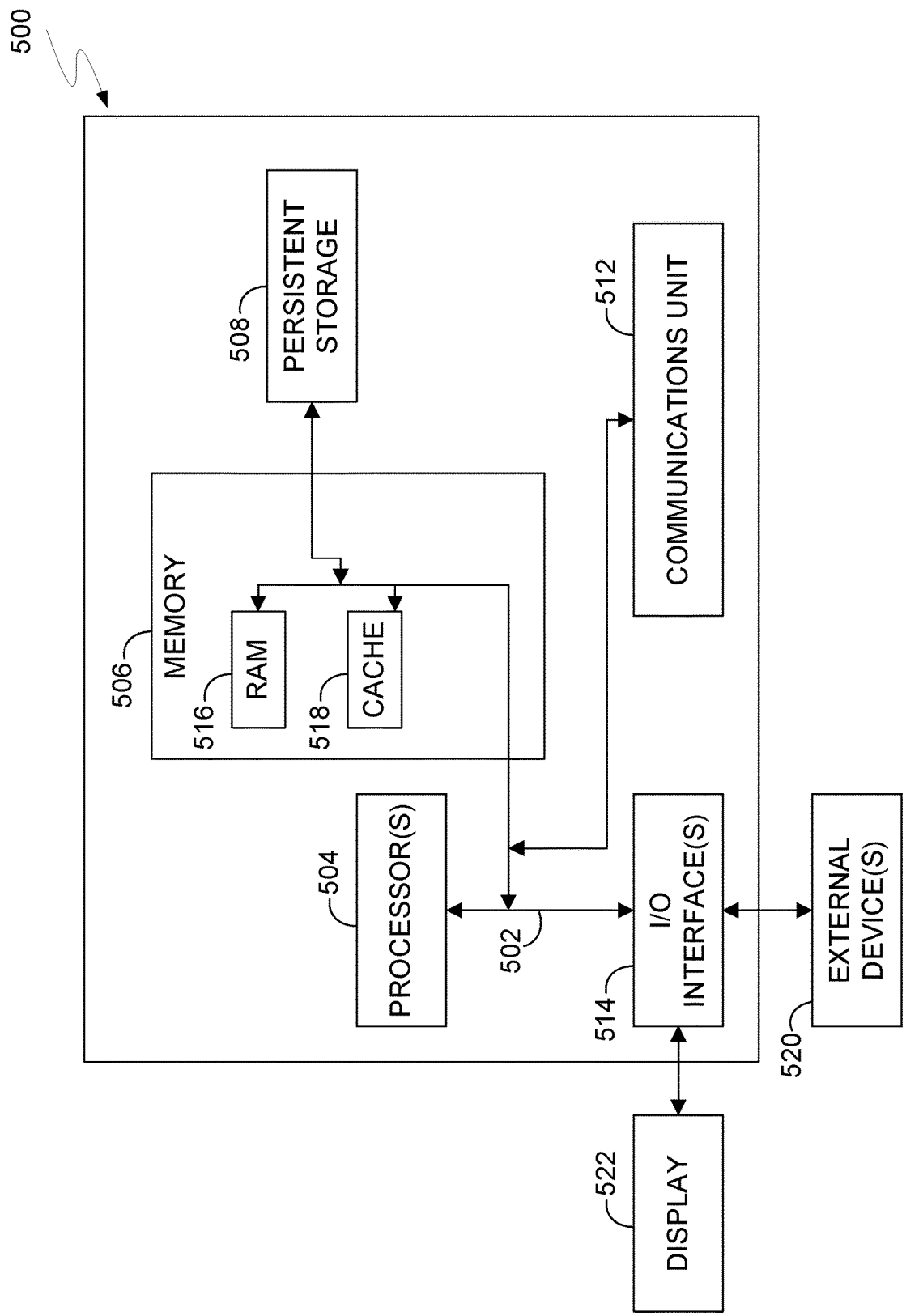
FIG. 5 is a block diagram depicting components of a computer, generally designated 500, suitable for executing container orchestration program 101 in accordance with at least one embodiment of the invention.

FIG. 5 is a block diagram depicting components of a computing device, generally designated 500, suitable for executing container orchestration program 101, management server 110, private network computing device(s) 120, public network computing device(s) 130, and/or any computing devices generally depicted in FIG. 1 in accordance with at least one embodiment of the invention. Computing device 500 includes one or more processor(s) 504 (including one or more computer processors), communications fabric 502, memory 506 including, RAM 516 and cache 518, persistent storage 508, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile one or more computer readable storage media.

Program instructions for container orchestration program 101 can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
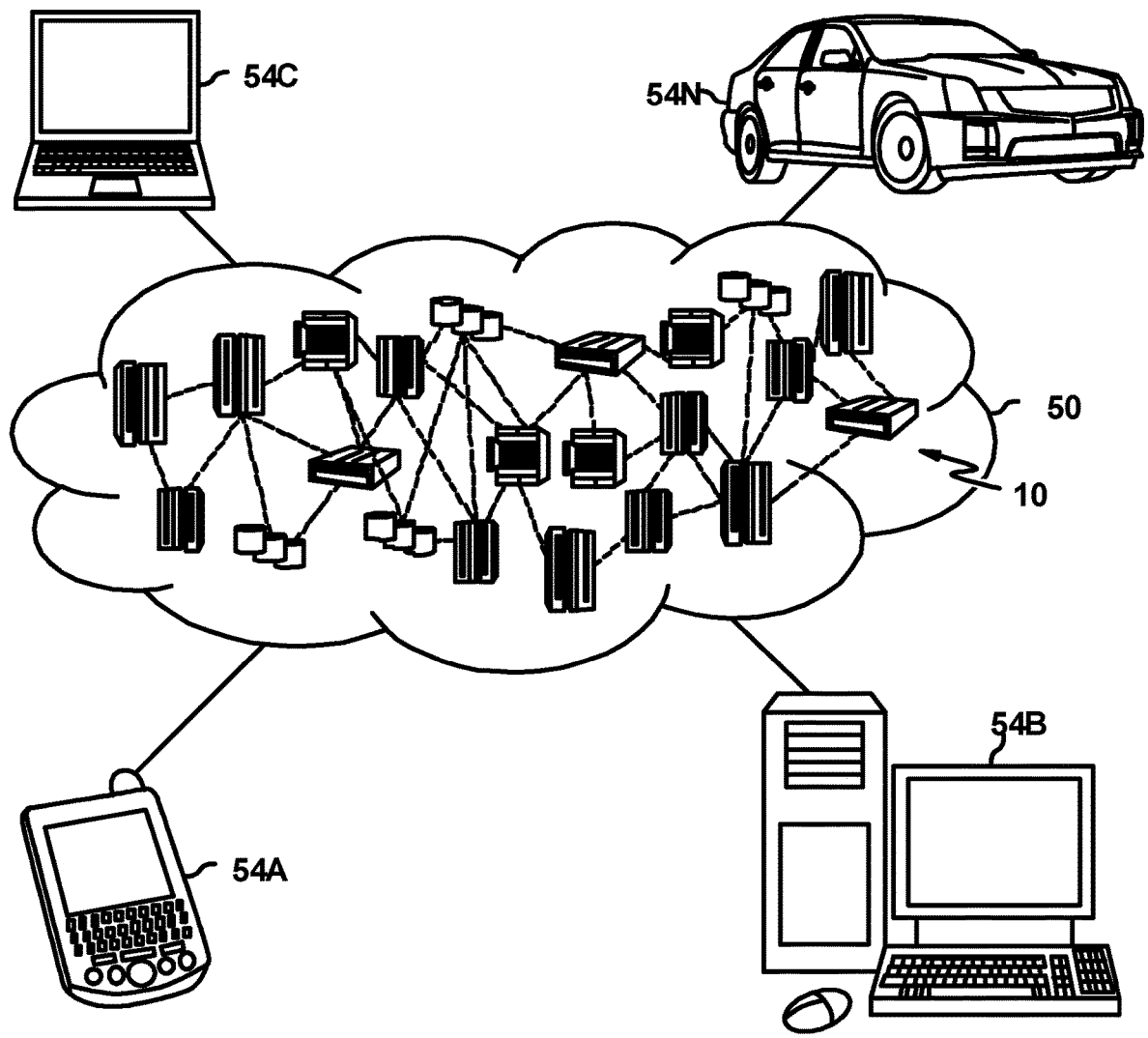
FIG. 6 is a block diagram depicting a cloud computing environment in accordance with at least one embodiment of the present invention.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
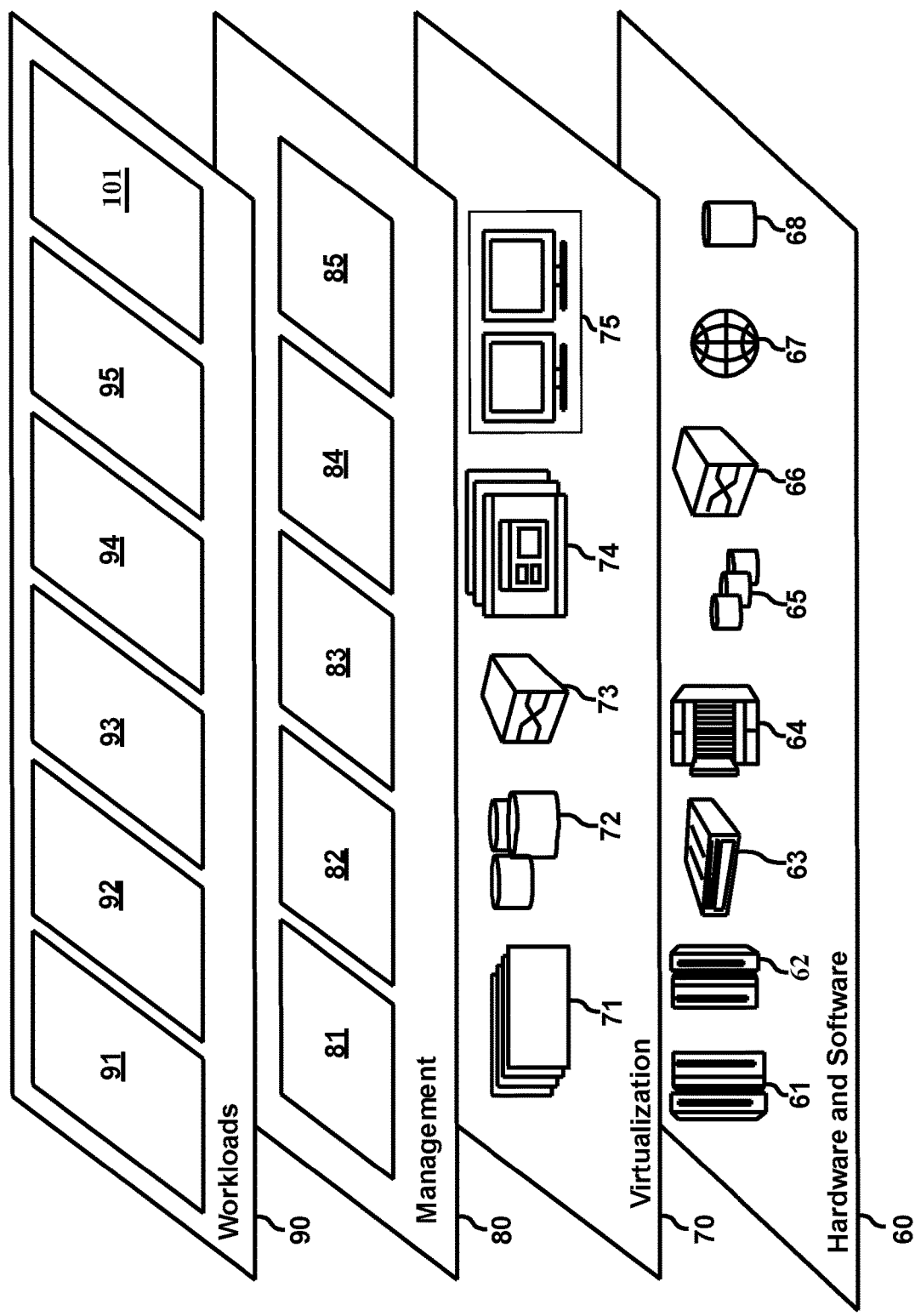
FIG. 7 is block diagram depicting abstraction model layers in accordance with at least one embodiment of the present invention.

FIG. 7 is block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container orchestration 101.

What is claimed is:

1. A computer-implemented method for deploying containers in a decentralized network computing environment, comprising:
 receiving, by the one or more processors, a request from a consumer node to provide services for deployment of a container workload;

selecting, by the one or more processors, a first computing device from a plurality of computing devices registered to serve as a worker node for deployment of the container workload;

obtaining, by the one or more processors, unidirectional control over a portion of a predetermined amount of computing resources reserved by the first computing device for utilization as the worker node for deployment of the container workload for a predetermined period of time during which the portion of the predetermined amount of computing resources are reserved by the first computing device, wherein said unilateral control locks out the first computing device from accessing or otherwise utilizing the predetermined amount of computing resources during the predetermined period of time;

deploying, by the one or more processors, the container workload on the first computing device; and detecting, by the one or more processors during said deploying the container workload on the first computing device, a failure of the deployed container workload and in response, removing, by the one or more processors, the unidirectional control from the first computing device by (i) generating a replica of the container workload deployed on the first computing device and (ii) deploying the replica of the container workload on a second computing device included in the plurality of computing devices registered to serve as a worker node.

2. The computer-implemented method of claim 1, further comprising:

determining, by the one or more processors, that the container workload includes stateful containers, wherein each stateful container remembers at least some information with regards to a state of each stateful container each time a containerized application for each stateful container runs, and wherein said determining that the container workload includes stateful containers is based on accessing information included in one or more images used to form the stateful containers included in the container workload or based on accessing information included in one or more templates for building the stateful containers included in the container workload;

linking, by the one or more processors, a volume to a stateful container; and mounting, by the one or more processors, the volume as a local file system on the first computing device.

3. The computer-implemented method of claim 2, wherein mounting the volume as a local file system on the first computing device further includes:

retrieving, by the one or more processors, temporary security credentials received in the request from the consumer node to obtain access to the volume;

sending, by the one or more processors, the temporary security credentials to the first computing device;

receiving, by the one or more processors, a request from the first computing device to obtain access to the volume; and granting, by the one or more processors, the first computing device access to the volume based on validating the temporary security credentials.

4. The computer-implemented method of claim 1, further comprising:

after said generating the replica and said deploying the replica, terminating, by the one or more processors, the unidirectional control over the portion of the predetermined amount of computing resources reserved by the first computing device.

5. The computer-implemented method of claim 1, further comprising:

selecting, by the one or more processors, the second computing device from the plurality of computing devices to serve as a standby worker node.

6. The computer-implemented method of claim 1, wherein:

the consumer node is a master node residing within a centralized network computing environment; and the first computing device resides outside of the centralized network computing environment.

7. The computer-implemented method of claim 1, wherein:

the consumer node is a master node residing within a first centralized network computing environment; and the first computing device resides within a second centralized network computing environment that is inaccessible to the consumer node.

8. The computer-implemented method of claim 1, wherein:

the consumer node is a master node residing within a decentralized network computing environment; and the first computing device resides within a centralized network computing environment that is inaccessible to the consumer node.

9. The computer-implemented method of claim 1, wherein said removing the unidirectional control from the first computing device comprises receiving a request from the first computing device to relinquish the unidirectional control over the predetermined amount of computing resources reserved by the first computing device.

10. A computer program product for deploying containers in a decentralized network computing environment, the computer program product comprising one or more computer readable storage media and program instructions stored on the one or more computer readable storage media, the program instructions including instructions to:

receive a request from a consumer node to provide services for deployment of a container workload;

select a first computing device from a plurality of computing devices registered to serve as a worker node for deployment of the container workload;

obtain unidirectional control over a portion of a predetermined amount of computing resources reserved by the first computing device for utilization as the worker node for deployment of the container workload for a predetermined period of time during which the portion of the predetermined amount of computing resources are reserved by the first computing device, wherein said unilateral control locks out the first computing device from accessing or otherwise utilizing the predetermined amount of computing resources during the predetermined period of time;

deploy the container workload on the first computing device; and detect, during deployment of the container workload on the first computing device, a failure of the deployed container workload and in response, remove the unidirectional control from the first computing device by (i) generation of a replica of the container workload deployed on the first computing device and (ii) deployment of the replica of the container workload on a second computing device included in the plurality of computing devices registered to serve as a worker node.

11. The computer program product of claim 10, further comprising program instructions to:
    determine that the container workload includes stateful containers, wherein each stateful container remembers at least some information with regards to a state of each stateful container each time a containerized application for each stateful container runs, and wherein said determining that the container workload includes stateful containers is based on accessing information included in one or more images used to form the stateful containers included in the container workload or based on accessing information included in one or more templates for building the stateful containers included in the container workload;
    link a volume to a stateful container; and
    mount the volume as a local file system on the first computing device.

12. The computer program product of claim 11, wherein the program instructions to mount the volume as a local file system on the first computing device further comprise instructions to: retrieve temporary security credentials received in the request from the consumer node to obtain access to the volume;
    send the temporary security credentials to the first computing device; receive a request from the first computing device to obtain access to the volume; and
    grant the first computing device access to the volume based on validating the temporary security credentials.

13. The computer program product of claim 10, further comprising program instructions to:
    after the replica has been generated and deployed, terminate, by one or more processors, the unidirectional control over the portion of the predetermined amount of computing resources reserved by the first computing device.

14. The computer program product of claim 10, further comprising program instructions to:
    select the second computing device from the plurality of computing devices to serve as a standby worker node.

15. The computer program product of claim 10, wherein the removal of the unidirectional control from the first computing device comprises receiving a request from the first computing device to relinquish the unidirectional control over the predetermined amount of computing resources reserved by the first computing device.

16. A computer system for deploying containers in a decentralized network computing environment, comprising: one or more computer processors; one or more computer readable storage media; computer program instructions; the computer program instructions being stored on the one or more computer readable storage media for execution by the one or more computer processors; and the computer program instructions including instructions to:
    receive a request from a consumer node to provide services for deployment of a container workload;
    select a first computing device from a plurality of computing devices registered to serve as a worker node for deployment of the container workload; obtain unidirectional control over a portion of a predetermined amount of computing resources reserved by the first computing device for utilization as the worker node for deployment of the container workload for a predetermined period of time during which the portion of the predetermined amount of computing resources are reserved by the first computing device, wherein said unilateral control locks out the first computing device from accessing or otherwise utilizing the predetermined amount of computing resources during the predetermined period of time;
    deploy the container workload on the first computing device; and
    detect, during deployment of the container workload on the first computing device, a failure of the deployed container workload and in response, remove the unidirectional control from the first computing device by (i) generation of a replica of the container workload deployed on the first computing device and (ii) deployment of the replica of the container workload on a second computing device included in the plurality of computing devices registered to serve as a worker node.

17. The computer system of claim 16, further comprising program instructions to:
    determine that the container workload includes stateful containers, wherein each stateful container remembers at least some information with regards to a state of each stateful container each time a containerized application for each stateful container runs, and wherein said determining that the container workload includes stateful containers is based on accessing information included in one or more images used to form the stateful containers included in the container workload or based on accessing information included in one or more templates for building the stateful containers included in the container workload;
    link a volume to a stateful container; and
    mount the volume as a local file system on the first computing device.

18. The computer system of claim 17, wherein the program instructions to mount the volume as a local file system on the first computing device further comprise instructions to:
    retrieve temporary security credentials received in the request from the consumer node to obtain access the volume;
    send the temporary security credentials to the first computing device;
    receive a request from the first computing device to obtain access to the volume; and
    grant the first computing device access to the volume based on validating the temporary security credentials.

19. The computer system of claim 16, further comprising program instructions to:
    after the replica has been generated and deployed, terminate, by one or more processors, the unidirectional control over the portion of the predetermined amount of computing resources reserved by the first computing device.

20. The computer system of claim 16, wherein the removal of the unidirectional control from the first computing device comprises receiving a request from the first computing device to relinquish the unidirectional control over the predetermined amount of computing resources reserved by the first computing device.

* * * * *